Oct. 12, 1926.
M. M. BORDEN
1,602,563
FLOW CONTROLLER
Filed Oct. 4, 1920  2 Sheets-Sheet 2
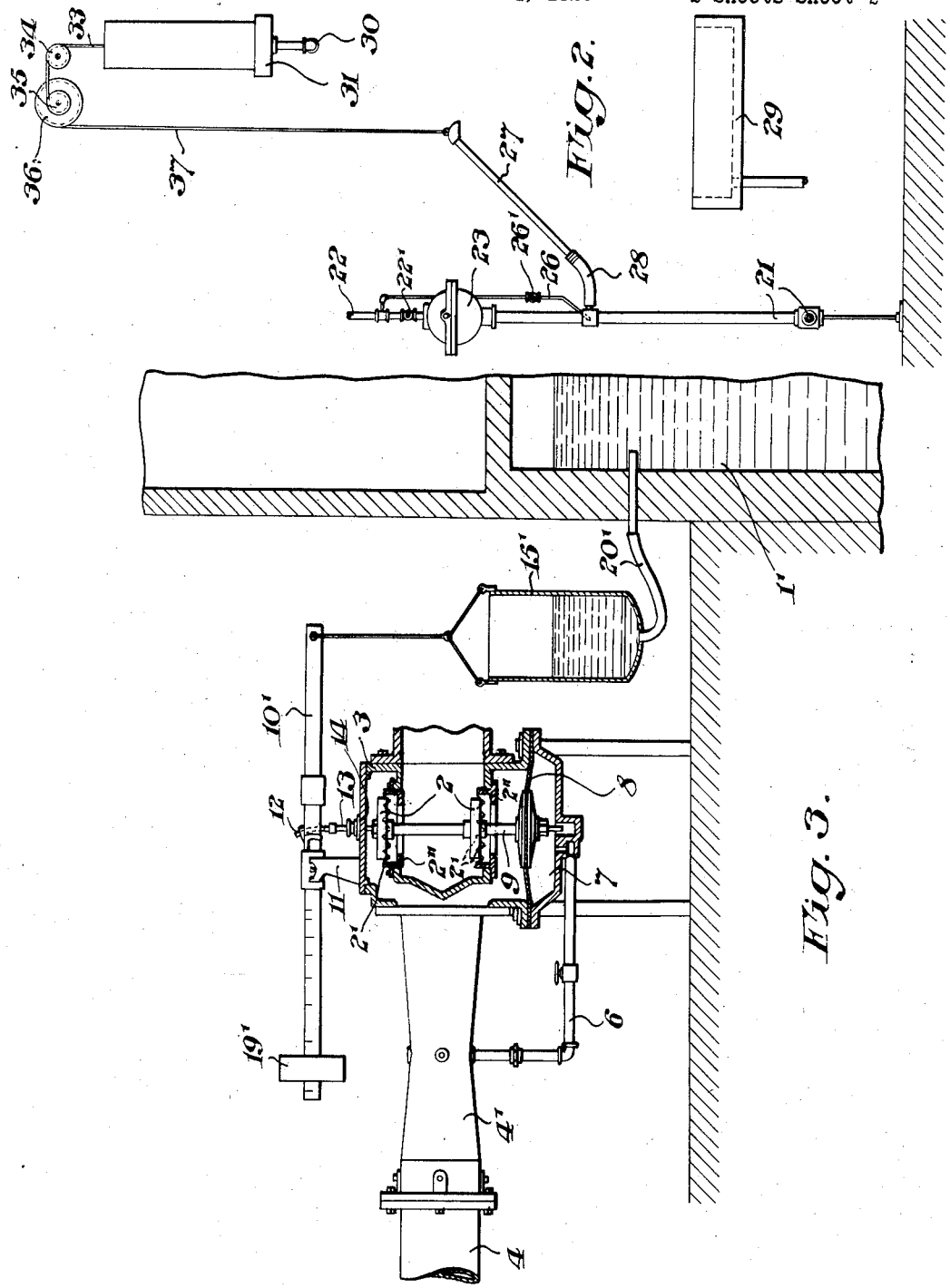
Inventor,
Moro M. Borden,
By Butler & Denny
Attorney.

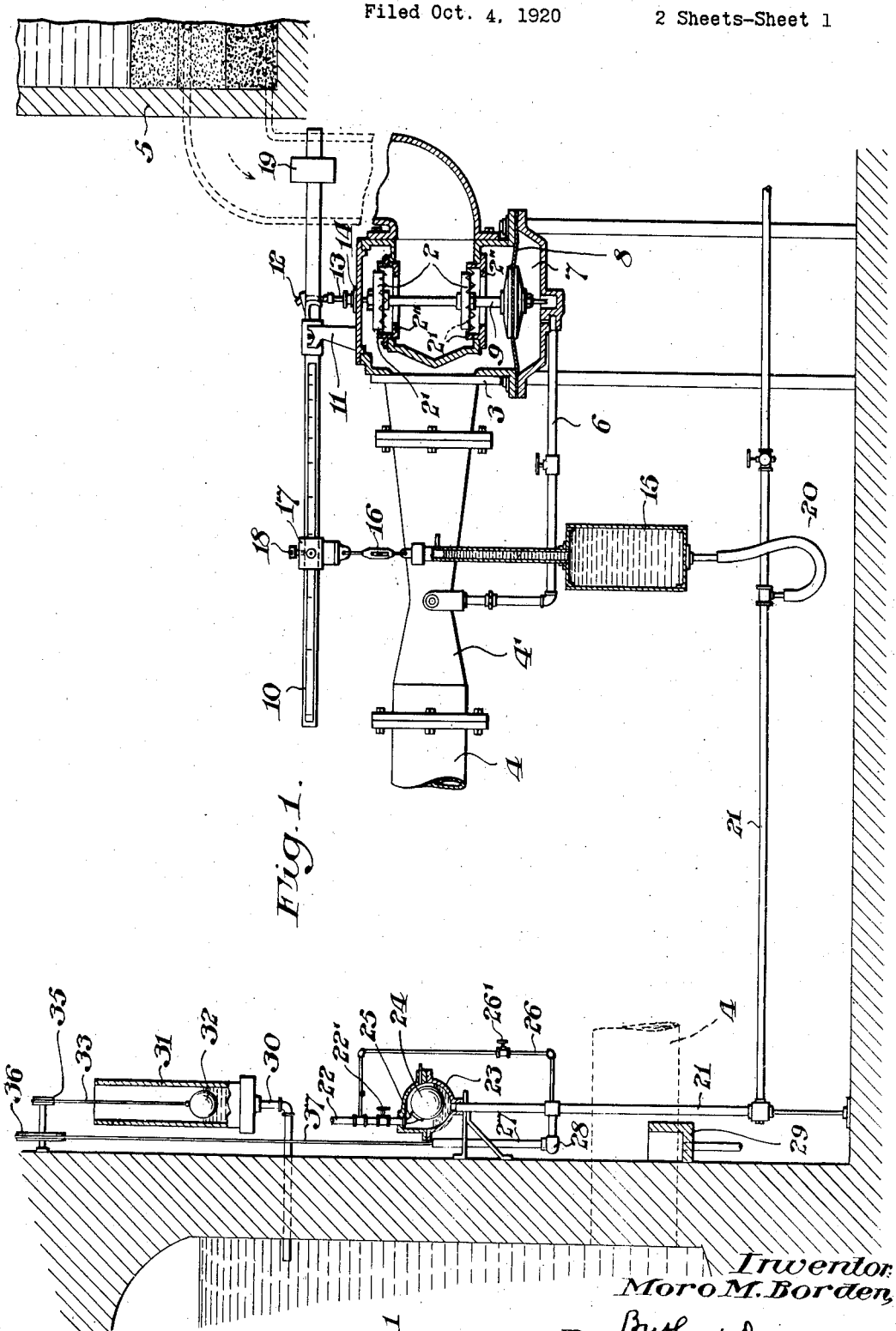

Patented Oct. 12, 1926.

1,602,563

UNITED STATES PATENT OFFICE.

MORO M. BORDEN, OF COLLINGSWOOD, NEW JERSEY, ASSIGNOR TO SIMPLEX VALVE & METER COMPANY, OF PHILADELPHIA, PENNSYLVANIA, A CORPORATION OF NEW JERSEY.

FLOW CONTROLLER.

Application filed October 4, 1920. Serial No. 414,708.

This invention is a flow controller that will automatically regulate the rate between a maximum and a minimum at which the flow is cut off and it is designed for maintaining automatically a desired store of water in a reservoir as in the clear water well of a filter plant.

The invention is characterized by the use of a valve subject to regulation by differential pressure means and by a float, acting in functional relation to variation of the head of the fluid to be controlled.

In its preferred form, the invention comprises the combination with a main conduit containing a Venturi tube and a valve having regulating means operated by differential pressures obtained by means of such tube, of auxiliary valve controlling means comprising a fluid counter poise variable in weight with the head of water in the well or reservoir to regulate and close said valve in functional relation to changes in said head.

In the accompanying drawings, Fig. 1 is a part sectional elevation of a construction illustrating a form of the invention; Fig. 2 is a part sectional side elevation of a detail of the construction shown in Fig. 1 viewed at right angles thereto, and Fig. 3 is a part sectional elevation of a modified construction.

In the construction illustrated in Figs. 1 and 2, the head of water in the well or reservoir 1, which it is desired to maintain approximately constant, regulates the position of the balanced valve 2 adapted to reciprocate in a case 3 in the conduit 4, which may supply water from a filter bed 5 delivering to the well.

A Venturi tube 4' in the conduit 4 has its throat connected by the duct 6 with the chamber 7 which is separated from the case 3 by the diaphragm 8 having the valve stem 9 fixed thereto. A lever or scale beam 10 fulcrumed on a bearing 11 carried by the case 3, has a rocking connection 12 with a tension member 13 which passes therefrom through the gland 14 in the top of the case to a connection with the valve stem. A hollow poise or vessel 15 depends from a turnbuckle 16 which depends from a slide 17 movable along and adapted to be fixed by a set screw 18 in position on an arm of the beam, the hollow weight or poise thus carried acting to open the valve and elevate the counter poise 19 adjustable on the other arm of the beam.

The bottom of the vessel 15 is connected by a flexible tube 20 with a conduit 21 supplied from any desired source through the conduit 22 (containing a valve 22') with water adapted to rise to a desired level in the float chamber 23 connected therewith. A float 24 in the chamber 23 is provided with a valve 25 adapted for closing the communication of the conduit 22 with the chamber through the top thereof; the conduits 21 and 22 being connected by a smaller conduit 26 (containing a valve 26') to bypass the chamber 23, fill the vessel 15 and open the valve 2 in case of necessity.

A tubular arm 27 has a hinged connection 28 with the conduit 21. The free end of the arm 27 is movable to the height of the water level in the chamber 23 and to lower levels, for the purpose of regulating the level of water in the vessel 15 and in the chamber 23, the arm discharging into the waste basin 29. The position of the arm 27 is determined by the water in the well 1 which is connected through the conduit 30 with the bottom of a stand pipe or chamber 31. A float 32 in the chamber 31 is connected by a cord or tension member 33 (which passes over an idler sheave 34) with a sheave 35 which is fixed to a larger sheave 36, and a cord or tension member 37 passes over the sheave 36 to a connection with the free end of the arm 27.

In operation, as the water rises in the well 1, it rises to the same level in vessel 31, and the float 32 rises therewith. The arm 27 falls proportionally as the float 32 rises, due to the relaxation of the tension on the cords 33 and 37. As the arm 27 is lowered, the water levels in the vessel 15 and chamber 23 are lowered, with resulting diminution of the force acting on the lever 10 to open the valve 2 which is closed proportionally, thus reducing the flow from the filter 5 to the well 1 in functional relation thereto. As the level in the well falls by a draft thereon, the float 32 falls therewith and the arm 27 rises so that the water level in the vessel 15 and the chamber 23 rises proportionally. The now increased weight of the vessel with its contents rocks the lever 10 to open the valve 2 proportionally, the valve being fully opened when the lowest desired level has been reached in the well and the supply of water flowing through the conduit 4 to the well then being at the maximum.

The valve 2, as shown, comprises two pistons having serrated cylindrical ports 2', for permitting a gradual change in the flow therethrough as the positions of the pistons change with relation thereto, and with the seats 2'' which permit the flow to be wholly cut off when the pistons are seated, the construction permitting closure without shock.

The rate at which the valve acts may be varied by adjusting the position of the slide 17.

It will be understood that as the fluid pressures communicated to the opposite sides of the diaphragm 8, from the conduit 4 through the valve case 3 and through the duct 6 by way of the chamber 7, are equal when there is no flow in the conduit, and the differential pressure acting to force the diaphragm down and close the valve increases in functional relation with the increased rate of flow, the action of the valve 2 is thus regulated functional in relation to the head in addition to the functional regulation by the vessel 15.

As illustrated in Fig. 3, the valve 2 acting in the valve case 3 of the conduit 4 has its stem extension 13 connected with a lever 10' provided with the adjustable weight 19', which acts to open the valve, and a vessel or hollow poise 15' which acts to close the valve. The bottom of the vessel 15' is connected by a flexible tube 20' with the interior of the well 1', the well and vessel having a common water level.

As the water in the well 1' rises and the depth of water in the vessel 15' increases therewith, the vessel descends and acts through the lever 10' to close the valve 2. As the water in the well falls the depth of water in the vessel decreases and the poise 19' acts through the lever to open the valve. The movement of the valve is controlled by its pressures communicated from its case 3 and its conduit 6 upon the diaphragm 8 connected with its stem 9 as previously described, the valve closing upon its seats 2'' without shock by reason of the relation of its pistons to the serrated ports 2'.

Having described my invention, I claim:—

1. The combination with a reservoir, a conduit communicating therewith, and a valve controlling said conduit, of means operable by variations in the rate of flow of fluid in said conduit for moving said valve, and means operable by variations in the head of fluid in said reservoir for moving said valve.

2. In a flow controller, the combination with a conduit and a valve controlling said conduit, of means operable by variations in the rate of flow of fluid in said conduit for moving said valve and means comprising a fluid operable poise for operating said valve and varying the rate of flow permitted by said first named means.

3. In a flow controller, the combination of a liquid conduit and a valve for controlling the flow through said conduit, of means for regulating the position of said valve and the flow through said conduit in functional relation to the head of liquid in said conduit, said means comprising a lever connected with said valve, a hollow poise connected with said lever, a conduit comprising a flexible coupling with said poise for supplying liquid thereto and mechanism for maintaining a head of liquid in said conduit second named differing from but having a constant functional relation to the liquid head of said conduit first named.

4. In a flow controller, the combination with a reservoir, a liquid conduit connected therewith, and a valve for controlling the flow through said conduit, of means for regulating the position of said valve and the flow through said conduit in functional relation to the head of liquid in said reservoir, said means comprising a lever connected with said valve, a hollow poise carried by said lever, a conduit having a flexible connection with said poise, means for supplying liquid to said conduit second named, a hollow discharge device having a flexible connection with said conduit second named for providing a variable pressure head therein, and means for regulating the elevation of the outlet of said device in functional relation to the head of liquid in said reservoir.

5. In a flow controller, the combination with a reservoir, a conduit connected therewith, and a valve for regulating the flow through said conduit, of means for regulating said valve and the flow through said conduit in functional relation to the head of liquid in said reservoir, said means comprising a lever connected with said valve, a hollow poise suspended from said lever, a conduit having a flexible connection with said poise, a float chamber adapted for supplying a liquid to said conduit second named, means comprising a float in said chamber and a valve for regulating the supply of liquid to said conduit second named, an oscillatory discharging arm connected with said conduit second named, and means comprising a float movable in functional relation to the level of liquid in said reservoir for moving said arm.

In testimony whereof I have hereunto set my name this first day of October, 1920.

MORO M. BORDEN.